United States Patent [19]

Jeng et al.

[11] Patent Number: 5,676,883
[45] Date of Patent: Oct. 14, 1997

[54] SILICON-CONTAINING NETWORKED NON-LINEAR OPTICAL COMPOSITIONS

[75] Inventors: Ru Jong Jeng, Chelmsford; Yong Ming Chen, Lowell, both of Mass.; Aloke Kumar Jain, Bangalore, India; Jayant Kumar, Lowell; Sukant Kishore Tripathy, Acton, both of Mass.

[73] Assignee: University of Massachusetts Lowell, Lowell, Mass.

[21] Appl. No.: 449,159

[22] Filed: May 24, 1995

Related U.S. Application Data

[62] Division of Ser. No. 950,398, Sep. 23, 1992, Pat. No. 5,433,895.
[51] Int. Cl.$^6$ ............................................. F21V 9/00
[52] U.S. Cl. ............................................ 252/582; 252/587
[58] Field of Search .................................... 252/582, 587, 252/589; 359/326, 328

[56] References Cited

U.S. PATENT DOCUMENTS

| | | | |
|---|---|---|---|
| 4,851,270 | 7/1989 | Che et al. | 428/1 |
| 4,861,129 | 8/1989 | Che et al. | 359/328 |
| 4,898,755 | 2/1990 | Che et al. | 252/582 |
| 4,937,017 | 6/1990 | Gillberg-LaForce | 252/582 |
| 5,071,674 | 12/1991 | Nogues et al. | 427/57 |
| 5,130,397 | 7/1992 | Zeigler | 528/9 |
| 5,155,195 | 10/1992 | Fever | 526/243 |
| 5,252,654 | 10/1993 | David et al. | 524/414 |
| 5,254,655 | 10/1993 | Gibbons et al. | 528/15 |
| 5,272,240 | 12/1993 | Haruvy et al. | 528/10 |
| 5,298,588 | 3/1994 | Gibbons et al. | 528/15 |
| 5,319,121 | 6/1994 | Blum | 556/457 |
| 5,324,827 | 6/1994 | Camberlin et al. | 534/854 |
| 5,357,015 | 10/1994 | Haruvy et al. | 252/582 |
| 5,433,895 | 7/1995 | Jeng et al. | 252/582 |
| 5,449,733 | 9/1995 | Zyss et al. | 252/582 |

OTHER PUBLICATIONS

Zhang et al., "Second–Order Nonlinear Optical Properties of N–(4–Nitrophenyl)–(S)–prolinol–Doped Sol–Gel–Processed Materials," *Chem. Mater.*, 4(4):851–855 (1992).

Kim et al., "Second Harmonic Generation in Organically Modified Sol–Gel Films," *Chem. Mater.*, 4(2):249–252 (1992).

*Primary Examiner*—Philip Tucker
*Attorney, Agent, or Firm*—Hamilton, Brook, Smith & Reynolds, P.C.

[57] ABSTRACT

A nonlinear optical composition and a method of forming the nonlinear optical composition are disclosed. The nonlinear optical composition includes a silicon-containing component and a nonlinear optical component which causes the nonlinear optical composition to exhibit second order nonlinear optical polarization of electromagnetic radiation, such as light. The method includes forming a sol of the silicon-containing component and the nonlinear optical component of the composition. A gel is formed from the sol. The nonlinear optical component is then poled while the gel is exposed to conditions sufficient to cause formation of a nonlinear optical composition which exhibits second order nonlinear optical polarization of electromagnetic radiation.

9 Claims, 8 Drawing Sheets

SILICON-CONTAINING NETWORKED NONLINEAR OPTICAL COMPOSITIONS

RELATED APPLICATION

This application is a division of application Serial No. 07/950,398 filed Sep. 23, 1992 now U.S. Pat. No. 5,433,895 which is incorporated herein by reference in its entirety.

GOVERNMENT FUNDING

This invention was made with support from the Government, Contract No. ONR 06-5485-F, which has certain rights in the invention.

BACKGROUND OF THE INVENTION

Manipulation of electromagnetic radiation, particularly light, has received increasing attention in development of electro-optical signal transmission. One of the principal ways in which electromagnetic radiation can be modified is by polarization. The amount of polarization induced during transmission of electromagnetic radiation is generally determined by the medium through which the signal passes. The medium, in turn, can be characterized in terms of its effect on electromagnetic radiation by the following equation:

$$P = \chi^{(1)}E + \chi^{(2)}E + \chi^{(3)}E^{(3)}$$

where:

P is the total polarization induced in the electromagnetic radiation;

E is the local electric field generated by the electromagnetic radiation; and $\chi^{(1)}$, $\chi^{(2)}$, and $\chi^{(3)}$ are the first, second and third order polarization susceptibilities, respectively, of the electromagnetic wave transmission medium.

Materials which have relatively high second order polarization susceptibilities have been suggested for application in optical rectification and generation of electro-optical effects, such as alteration of the refractive index of the medium and phase alteration of electromagnetic radiation, and generation of parametric effects, such as second harmonic generation (SHG). However, second order polarization susceptibility typically is large enough for such applications only when the molecules of the optical transmission medium is noncentrosymmetric, wherein the molecules are each asymmetrical about their centers. Also, the largest values of second order polarization susceptibility are generally obtained in polymeric systems only by poling optically active molecules, thereby causing the molecular dipoles of the molecules to align.

Optical media which exhibit significant second order polarization effects on light have included, for example, noncentrosymmetric inorganic crystals, such as potassium dihydrogen phosphate and lithium niobate. However, other features of these inorganic crystals, such as difficult, expensive synthesis, and brittleness, have severely limited their range of application. Another attempt has been to incorporate poled (aligned) molecule dipoles, which exhibit second order polarization susceptibility, into an organic matrix which has been formed from an organic monomer. Such materials can be employed as thin films having good optical quality, but historically have had several problems. For example, the poled position of the dipoles is thermodynamically unstable. Therefore, polymer matrixes are usually employed which have a relatively high glass transition temperature, to thereby restrict the reorientation of poled dipoles. However, polymeric materials which have high glass transition temperatures generally cannot be employed in bulk to form articles which are of suitable optical quality for second order polarization. Moreover, poling can diminish with time even at temperatures which are significantly below the glass transition temperature.

Therefore, there is a need for a nonlinear optical composition and a method of forming such a composition which overcome the above-referenced problems.

SUMMARY OF THE INVENTION

The present invention relates to a new nonlinear optical composition and to a method of forming the nonlinear optical composition.

The nonlinear optical composition includes a silicon-containing component and a nonlinear optical component. The silicon-containing component can include the nonlinear optical component. The method includes forming a solution of a silicon-containing component and a nonlinear optical component. The solution is then exposed to conditions sufficient to cause formation of a gel. The nonlinear optical component is then poled, whereby the nonlinear optical component and the silicone-containing component together can form a nonlinear optical composition which exhibits nonlinear optical activity. The gel is then exposed to conditions sufficient to cause the gel to form the nonlinear optical composition.

The present invention has several advantages, such as a relatively high nonlinear optical component density. Further, the composition is thermodynamically stable and can be employed in bulk to form articles having good optical quality. Also, the composition of the invention is easy to prepare. In addition, other components, such as aromatic polyimides, can be included in the composition, thereby enabling formation of compositions having relatively low dielectric constants, such as are suitable for use in the electronics industry. The nonlinear optical composition of the invention also exhibits high modulus and strength over a wide temperature range, and has a relatively low thermal expansion coefficient.

DETAILED DESCRIPTION OF THE INVENTION

Figure 1:
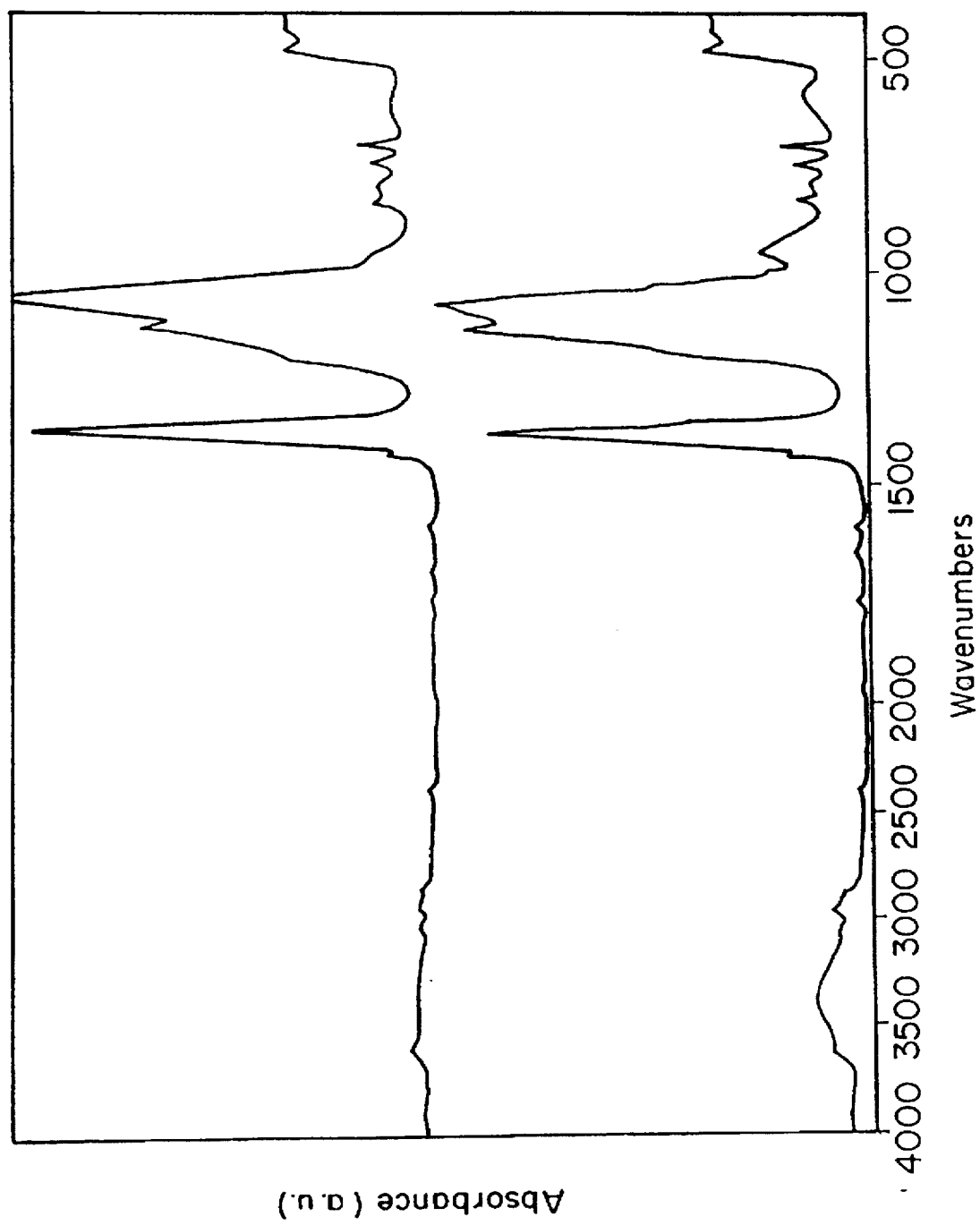
FIG. 1 shows infrared spectra of an embodiment of the nonlinear optical composition of the innovation described in Example 1.

The features and other details of the composition and method of the invention will now be more particularly described with reference to the accompanying drawings and pointed out in the claims. It will be understood that the particular embodiments of the invention are shown by way of illustration and not as limitations of the invention. The principle features of this invention can be employed in various embodiments without departing from the scope of the invention.

The nonlinear composition of the present invention includes a silicon-containing component and a nonlinear optical component. The nonlinear optical component is present in the nonlinear optical composition in an amount sufficient to cause the nonlinear optical composition to exhibit second order nonlinear polarization of electromagnetic radiation, such as light.

The silicon-containing component is a monomer or polymer which, in combination with a suitable nonlinear optical component, can form a composition which exhibits second order nonlinear polarization of electromagnetic radiation. In one embodiment, the silicon-containing component is a siloxane oligomer or polymer. In a particularly preferred embodiment, the siloxane is formed from a phenyl-siloxane, such as Accuglass 204® (A204®) phenyl-siloxane polymer, which has the formula $[(SiO)_a(C_6H_5)_b(OC_2H_5)_c(OH)d]_n$, where: $a \geq 1$; b, c, d, $\leq 0.5$; and n=5–100. Alternatively, the silicon-containing component can be an alkoxy-silane oligomer or polymer formed from an alkoxy-silane monomer. An example of a suitable alkoxy-silane monomer is formed by reacting a monoepoxy of (3-glycidoxypropyl) trimethoxysilane and a monoamine of 4-(4'-nitrophenylazo) phenylamine in an about equi-molar ratio. In still another embodiment, the silicon-containing component is a siloxane polymer formed from organosilane monomers, such as N-[3 (triethoxysilyl)propyl]-2,4-dinitrophenylamine or 3-(4-formylphenoxy)propyl-trimethoxysilane.

The nonlinear optical component is suitable for poling and for forming a film or an article which exhibits second order polarization susceptibility. Also, the nonlinear optical component is present in an amount sufficient to cause the resulting nonlinear optical composition to exhibit second order polarization susceptibility. Examples of suitable nonlinear optical components are chromophores and dyes which exhibit second order nonlinear optical polarization. A suitable dye is Disperse Red 1 (DR1), 4-[ethyl(2-hydroxyethyl) amino]-4'-nitroazobenzene, commercially available from Aldrich Chemical Company and recrystallized from benzene. Alternatively, the nonlinear optical component can be an alkoxy-silane dye, such as is formed by coupling a monoepoxy of (3-glycidoxypropyl)trimethoxysilane and a monoamine of 4-(4'-nitrophenylazo)phenylamine. Preferably, the weight ratio of the nonlinear optical component to the silicon-containing component is about 1:4. However, the optimal stoichiometric ratio is determined according to the particular components employed, so as to form a composition which provides a suitable linear optical quality.

In an alternative embodiment, such as wherein the nonlinear optical component also includes silicon, i.e., an alkoxy-silane, the nonlinear optical composition can include an additional polymer component. An example of a suitable additional polymer component is a polyimide, such as is formed from polyamic acid. Preferably, the molar ratio of the nonlinear optical component to the additional polymer component is about 1:4.

In another alternative embodiment, the nonlinear optical composition is formed from a multifunctional phenoxy compound and a nonlinear optical silicon-containing component. The multifunctional phenoxy compound has the following general structural formula:

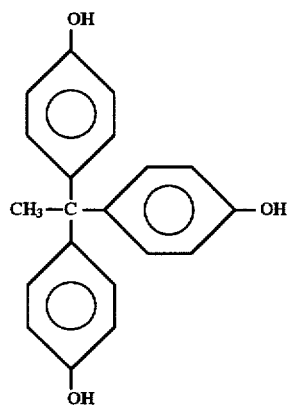

In a preferred embodiment, the nonlinear optical compound is an alkoxy-silane. Alternatively, the nonlinear optical compound is a phenoxy silane, a phenylsiloxane, or a combination of suitable nonlinear optical silicon-containing compounds.

The method of the invention includes forming a sol of the silicon-containing component and the nonlinear optical component. The solvent system of the sol is suitable for dissolving the silicon-containing component and the nonlinear optical component. An example of the suitable solvent is a solution of an alcohol and another organic solvent, such as a solution of propanol and acetone in a volume ratio of about 1:9.

The sol is then disposed on a surface by a suitable method, such as spin coating, and then exposed to conditions sufficient to volatilize the solvent component of the solution to thereby form a gel. An example of such conditions are exposure of the sol to an atmosphere of reduced pressure, at a temperature of about 70° C., for a period of time of about twelve hours.

The resulting gel is then exposed to an electric field which causes poling of the nonlinear optical component of the film. The poling is sufficient to cause a nonlinear optical composition formed from the gel to exhibit second order nonlinear optical polarization of electromagnetic radiation, such as light. Preferably, the poling is conducted by corona discharge, such as is described in Mandal et al., *Eur. Polym. J.*, Vol. 27, pg. 735 (1991), the teachings of which are incorporated herein by reference.

While poling of the nonlinear optical component continues, the gel is exposed to conditions sufficient to cause the gel to form a nonlinear optical composition which exhibits second order nonlinear optical polarization. In one embodiment, the gel is exposed to a temperature in the range of between about 200° and 220° C. for a period of time in the range of between about 0.17 and four hours. The period of time during which the film is cured is sufficient to cause the poled nonlinear optical component of the nonlinear optical composition formed to cause the nonlinear optical component to exhibit second order nonlinear optical polarization of electromagnetic radiation, such as light, after poling has terminated.

The precursors of the silicon-containing component and the nonlinear optical component in the nonlinear optical composition can be selected so that the nonlinear optical component is fixed in the poled position within the silicon-containing component by entrapment within the silicon-containing component. In one example of this embodiment, the silicon-containing component is polymerized and crosslinked. Alternatively, the silicon-containing component is polymerized but not crosslinked. In another embodiment, the silicon-containing precursor and the nonlinear optical component precursor are selected so that the nonlinear optical component is fixed in the poled position by reacting with the silicon-containing component during curing of the film. An example of this embodiment is the combination of a phenyl-siloxane polymer, as the silicon-containing component, and of an alkoxy-silane dye as the nonlinear optical component of the composition.

The invention will now be further illustrated by the following examples.

EXEMPLIFICATION

EXAMPLE 1

A nonlinear optical (NLO) composition of the invention was formed by the method of the invention, wherein the silicon-containing component was a phenyl-siloxane and the non-linear optical component was an azo dye.

A. Materials and Processing

The phenyl-siloxane component was Accuglass 204® (A204®) phenyl-siloxane, commercially available from Allied Signal, Inc. The formula for A204® phenylisiloxane was:

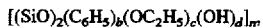

where: $a \geq 1$; b, c, $d \leq 0.5$; and n=5–100.

The azo dye was disperse red 1 (DR1), 4-[ethyl(2-hydroxyethyl)amino]-4'-nitroazobenzene which was available from the Aldrich Chemical Company, Inc., and was recrystallized from benzene. The structural formula of DR1 is shown below:

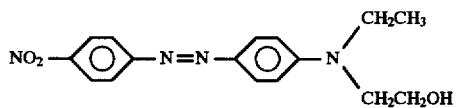

20 mg of DR1 in 0.14 g of 1, 4-dioxane was added into 2 g of A204® solution. Films were prepared by spincoating the phenyl-siloxane polymer/dye solution onto 1 mm-thick transparent microscope slides, and then baked at 70° under vacuum for 12 hours to remove residual solvent trapped in samples, thereby forming a gel. The typical thickness of the gels obtained was approximately 600 nm. Indices of refraction at three different wavelengths (532 nm, 633 nm and 1064 nm) was measured using an ellipsometer. The absorption characteristics of the NLO molecules in the polymeric film were recorded on a UV-vis-NIR spectrophotometer. The absorption peak wavelength of the NLO chromophore and the other linear optical properties of the DR1/A204® samples are summarized in Table I, shown below:

TABLE I

Linear Optical Properties of Accuglass 204® with DR1.

| Absorption peak wavelength (nm) | Thickness (nm) | n at wavelength (nm) | | |
|---|---|---|---|---|
| | | 532 | 633 | 1064 |
| 496 | 600 | 1.577 | 1.555 | 1.488 |

The DR1 of the gels were poled with a corona discharge in a wire-to-plane configuration. The details of the corona poling set-up are described in Mandal et al., *Eur. Polym. J.*:27 (1991) p. 735, the teachings of which are incorporated herein by reference. After the sample was poled at 80° C. for 6 min., the temperature was elevated to 220° C. to vitrify the sample. During this period (curing time) the poling field was kept on. The sample was maintained at 220° C. for 4 hours, and then cooled down to room temperature with the poling field left on. The curing temperature was chosen to be 220° C. because the thermal decomposition temperature of DR1 was determined to be approximately 254° C. by a Model TGA2950 thermogravimetric analyzer, commercially available from E. I. du Pont de Nemours & Co., at a heating rate of 10° C./min. in air.

B. Second Harmonic and Linear Electro-Optic Measurements

The second order NLO properties of the poled A204®/DR1 sample was measured by second harmonic generation (SHG) and electro-optical modulation techniques. The polarized Q-switched Nd:YAG laser with 10 ns pulse width and 20 Hz repetition rate was used as the light source. The typical energy per pulse of the laser was 15 mJ. The fundamental laser beam was blocked by a $CuSO_4$ solution and a 532 nm interference filter after passing through the sample. The second harmonic signal was detected by a photomultiplier tube, and averaged over 300 pulses in a boxcar integrator. The SHG intensity of a Y-cut single crystal of quartz with known thickness and $d_{11}$ value ($d_{11}$= -0.364 pm/V) (E. D. Palik, ed., *Handbook of Optical Constants* (Academic Press, New York, 1985)) was measured as a reference mounted at the same position as that of the sample. The detailed experimental set-up and calculations of the second-order NLO coefficient $d_{33}$ have been previously discussed in Jerphagnon et al., *J. Appl. Phys.*:41 (1970) 1667, and in Singer et al., *Appl. Phys. Lett.*:49 (1986) 248, the teachings of which are incorporated herein by reference. The measurement of linear electro-optic coefficient, $r_{33}$, was performed utilizing the method described by Teng et al., *Appl. Phys. Lett.*:56 (1990) 1734, and is shown below in Table II.

TABLE II

Second-order NLO Properties of Accuglass 204® with DR1

| $d_{33}$ (pm/V) at 1064 nm | $d_{31}$ (pm/V) at 1064 nm | $r_{33}$ (pm/V) at 633 nm |
|---|---|---|
| 1.54 | 0.47 | 0.71 |

The details of the experimental arrangement and the calculation of $r_{33}$ have been described earlier in Teng et al., *Appl. Phys. Lett.*:56 (1990) 1734, and in Mandal et al., *Synthetic Metals*:43 (1991) 3143, the teachings of which are incorporated herein by reference.

C. Results and Discussion

The curing behavior of A204® was studied by FTIR (commercially available from Mattson Instruments, Inc.)

and differential scanning calorimetry (ramp 10° C./min.). The dried A204® had an extremely broad glass transition zone, from 60° C. to 130° C., due to the wide molecular weight distribution. After 4 hours of curing at 220° C., the glass transition shifted to a much higher temperature region (110° C. to 252° C.).

After curing of A204® at 220° C. for 4 hours, an appreciable decrease of absorbance in ir spectra was observed due to the disappearance of hydroxyl groups around 3400 cm$^{-1}$, Si-ethoxyl bonds at 1136 cm$^{-1}$, hydroxyl and ethoxyl groups at 951 cm$^{-1}$, as shown in FIG. 1. Monosubstituted phenyl ring attachment to Si can be identified by the absorption peaks at 738 cm$^{-1}$ and 698$^{-1}$. The absorbances of these two peaks decreased slightly after curing. The absorption peak of Si-O-Si increased moderately after curing. From the IR spectrum, formation of a crosslinked network due to thermal condensation with the removal of the hydroxyl and ethoxyl moieties was clearly indicated. The cured A204®/DR1 sample was soaked in THF (which was a good solvent for DR1) for 2 hours. The solvent did not extract any measurable concentration of dye from the cured sample. This implied that the NLO dye, DR1, was firmly locked in the glass matrix.

Figure 2:
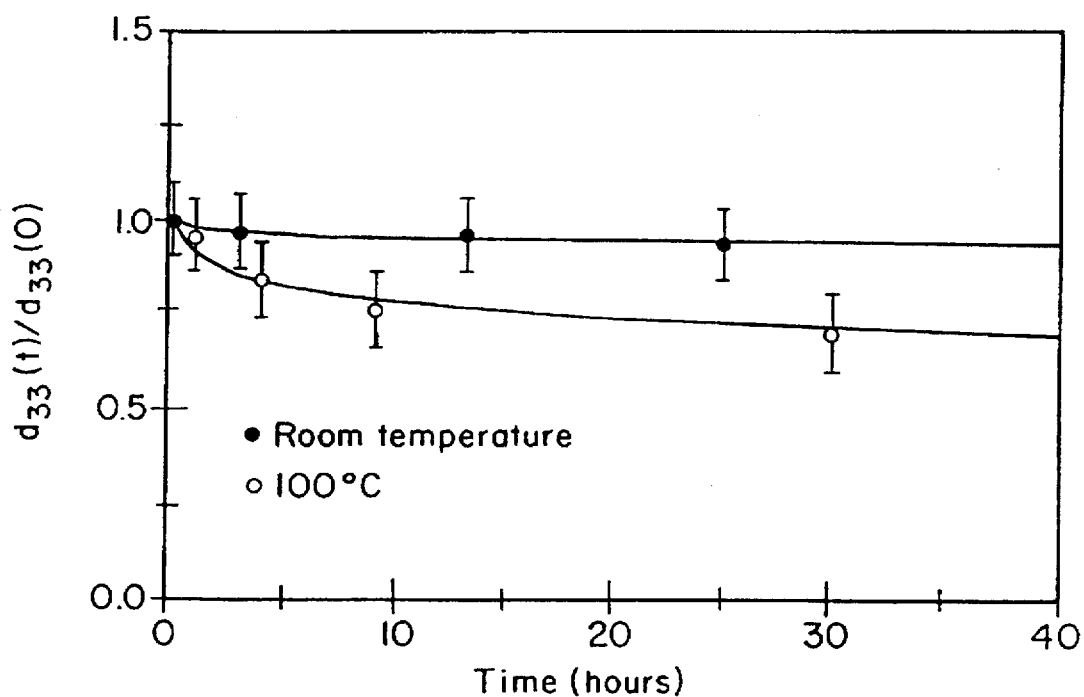
FIG. 2 shows plots of the second harmonic coefficient over time of the embodiment described in Example 1.

The stability of second order NLO properties of the poled/cured sample was monitored both at room temperature and at 100° C. for a 1 hour period. The rate of decay of the SHG signal became smaller for longer heating times. The SHG signal for poled/cured A204®/DR1 sample was monitored over a period of 30 hours. The experimental results were plotted, as shown in FIG. 2. The second harmonic coefficient, $d_{33}(t)$, was quite stable at room temperature as shown in FIG. 2, and decayed slowly at 100°C.

Figure 3:
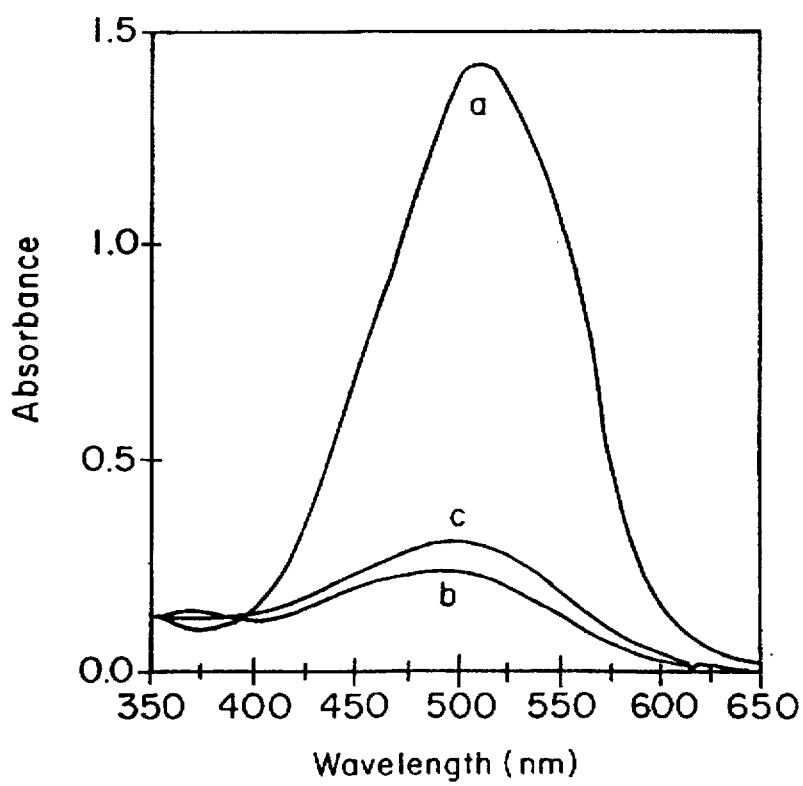
FIG. 3 shows UV-vis absorption spectra of the embodiment described in Example 1.
Figure 5:
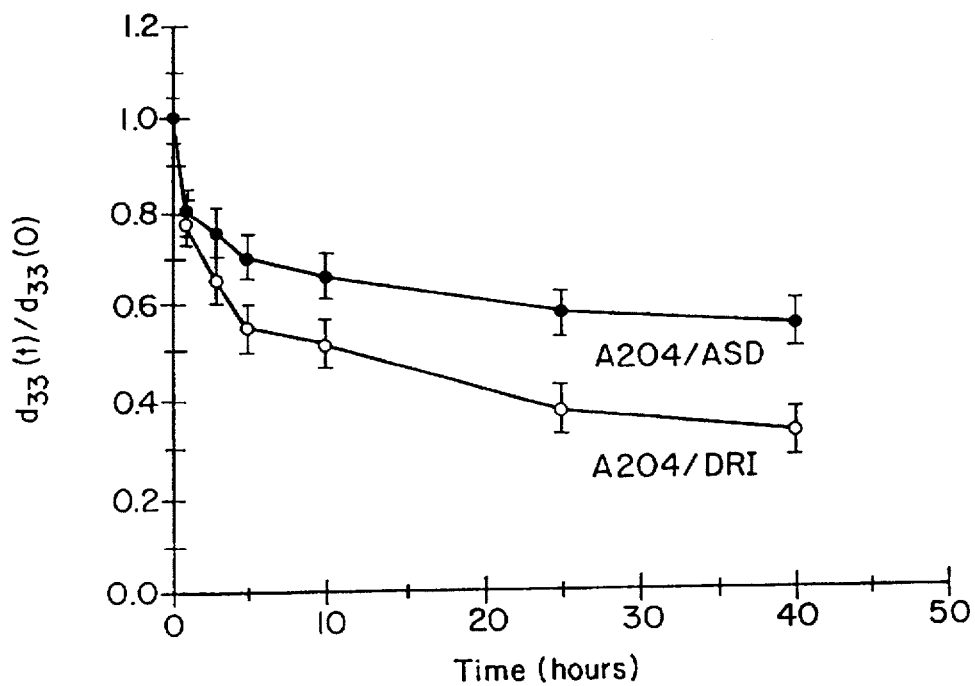
FIG. 5 shows plots of the second harmonic coefficient over time of the embodiments described in Example 2.

One of the problems encountered in the poling process of guest host systems at high temperatures was the sublimation of the dye at elevated temperatures. As long as the polymer was not vitrified, there was considerable loss of NLO chromophores at high temperatures. After the process of vitrification, the dye molecule loss was much less. FIG. 5 shows the absorption data (curve a) of the dye/polymer non-linear optical composition before the crosslinking and poling process. During the initial heating of the film to raise its temperature to 200° C. for the curing process a substantial amount of the dye sublimed away and deposited on surrounding surfaces. The poled and crosslinked nonlinear optical composition showed a much smaller absorbance due to sublimation as well as orientation of the dye molecules (curve b). The dye absorption spectrum shape was similar to the spectrum obtained before the curing cycle. This confirmed that the azo dye left in the cured film had not degraded during the curing cycle. Curve c in FIG. 3 shows the absorption spectrum after heating the poled and cured sample for additional 138 hours at 100° C. The increase in absorption of the sample was due to the slow but inevitable randomization of the polar orientation of the dye a 100° C.

The cured A204®/DR1 sample had an absorption peak at wavelength 496 nm. The second harmonic coefficients were calculated by taking into consideration the absorption present at the doubled frequency and these values were obtained resonantly enhanced. The values of $d_{33}$ and $d_{31}$ obtained were 1.54 pm/V and 0.47 pm/V, respectively. The ratio of $d_{33}$ and $d_{31}$ was about 3.3. The error in the measured values were mainly due to the errors in the values of refractive indices and thicknesses measured experimentally and uncertainties of a single crystal quartz reference. We estimated an error of 20% in the values of $d_{33}$ and $d_{31}$ reported.

EXAMPLE 2

A nonlinear optical composition of the invention was formed by the method of the invention, wherein the silicon-containing component was the same as that employed in Example 1 and the nonlinear optical component was an alkoxy-silane dye.

The alkoxy-silane dye (ASD) was synthesized by the coupling of a monoepoxy of (3-glycidoxypropyl) trimethoxysilane and a monoamine of 4-(4'-nitrophenylazo) phenyl amine (Disperse Orange 3), and had the following structural formula:

$$R-NH-CH_2-\overset{\overset{\displaystyle OH}{|}}{CH}-CH_2-O-(CH_2)_3-Si-(OCH_3)_3$$

where R =

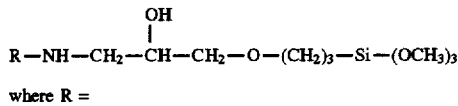

0.10 g of the ASD in 0.50 g acetone was added into 4 g of A204® solution. For the purpose of comparison, a solution of A204® and DR1 was also prepared as described in Example 1.

Gels were prepared by spin-coating the solutions onto 1 mm-thick transparent microscope slides, and then baked at 70° C. under vacuum for 12 hours to remove residual solvent trapped in samples, to thereby form gels. Typical thicknesses obtained were approximately 760 nm and 690 nm for the cured A204®/DR1 and A204®/ASD gels, respectively. Indices of refraction at two different wavelengths (532 nm and 1064 nm) were measured using an ellipsometer. The absorption characteristics of the NLO molecules in the gels were recorded on a UV-Vis-NIR spectrophotometer. The gels were poled by the corona discharge method, as described in Example 1. After the Samples were poled at 80° C. for 6 min, the temperature was increased to 200° C. to vitrify the samples. During this period (curing time) the poling field was kept on. The samples were maintained at 200° C. for 10 minutes, and then cooled down to room temperature with the poling field on. The curing temperature was chosen to be 200° C. because the thermal decomposition temperatures of ASD and DR1 were determined to be approximately 237° C. and 254° C., respectively, by a thermogravimetric analyzer at a heating rate of 10° C./min in air.

The second order NLO properties of the poled A204®/DR1 and A204®/ASD samples were measured by second harmonic generation (SHG). The polarized Q-switched Nd:YAG laser with 10 ns pulse width and 20 Hz repetition rate was used as the light source. The typical energy per pulse of the laser was 15 mJ. The fundamental laser beam after passing through the sample was blocked by $CuSO_4$ solution and a 532 nm interference filter. The second harmonic signals were detected by a photomultiplier tube, and averaged over 300 pulses in a boxcar integrator. The SHG intensity of a Y-cut single crystal of quartz with known thickness and $d_{11}$ value ($d_{11}$=0.364 pm/V) was measured as a reference mounted at the same position as that of the samples. The detailed experimental set-up and calculations of the second-order NLO coefficient $d_{33}$ were the same as those employed in Example 1. In addition, the $d_{33}$ values were corrected for absorption, as described in Mandal et al., Appl. Phys. Lett.:58 (1991) p. 2459, the teachings of which are incorporated herein by reference.

Figure 4:
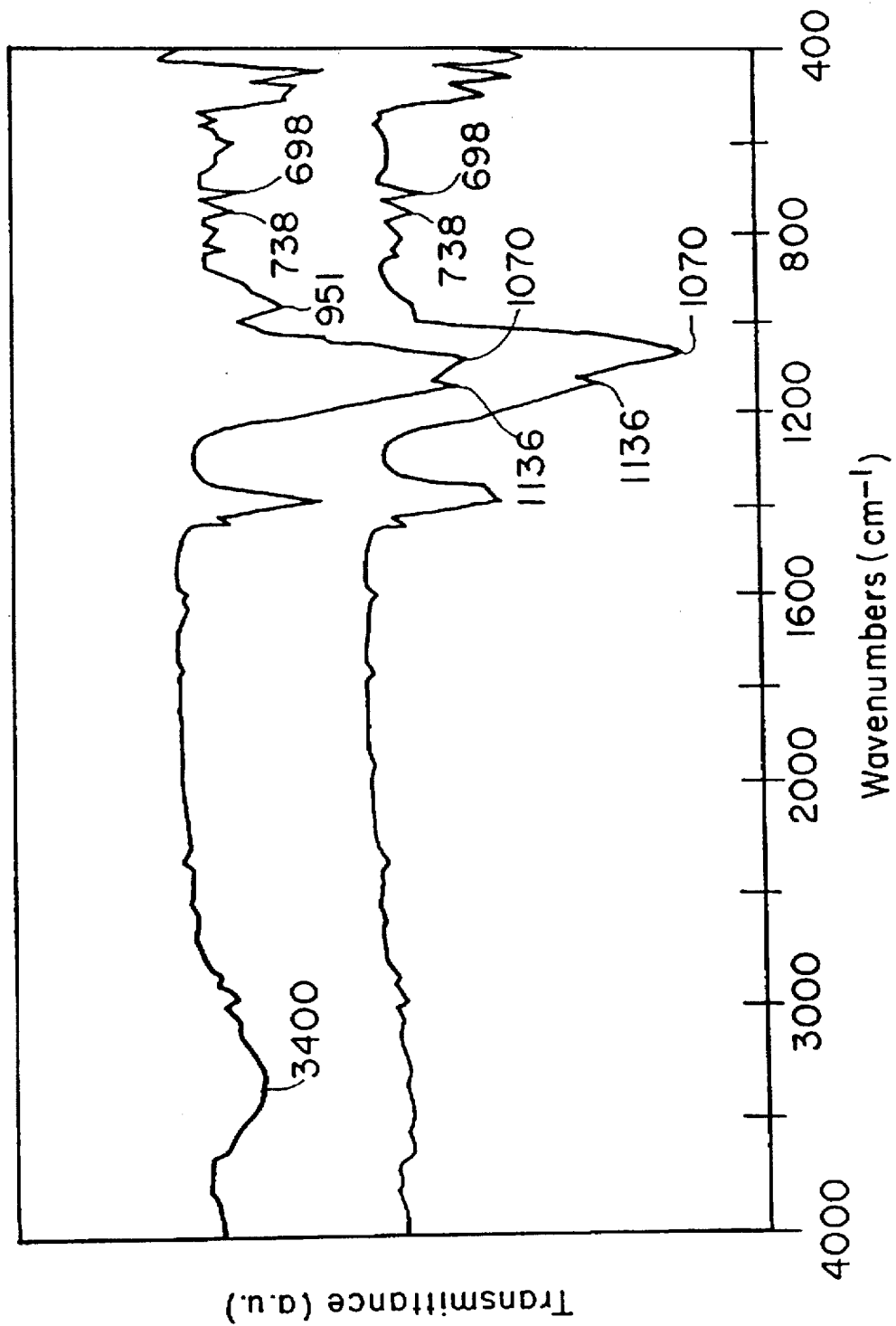
FIG. 4 shows infrared spectra of two embodiments of the nonlinear optical composition of the invention described in Example 2.

After curing the gels at 200° C. for 10 minutes, an appreciable decrease of absorbance in IR spectra were observed due to the disappearance of hydroxyl groups around 3400 cm$^{-1}$, Si-ethoxyl bonds at 1136 cm$^{-1}$, hydroxyl and ethoxyl groups at 951 cm$^{-1}$, as shown in FIG. 4.

Monosubstituted phenyl ring attachment to Si could be identified by the absorption peaks at 738 cm$^{-1}$ and 698 cm$^{-1}$. The absorbances of these two peaks decreased slightly after curing. The absorption peak of Si-O-Si (1070 cm$^{-1}$) increased moderately after curing. From the IR spectrum, enhanced formation of the Si-O-Si linkage due to thermal condensation with the removal of the hydroxyl and ethoxyl moieties was clearly indicated. The IR data also indicated that the NLO chromophores were not degraded during the curing process. The cured A204®/DR1 and A204®/ASD samples were soaked in THF (solvent for both DR1 and ASD) for 2 hours. The solvent did not extract any measurable concentration of dye from the cured sample. This implied that the NLO dye was firmly locked in the glass matrix.

The second order NLO properties of A204®/DR1 and A204®/ASD were characterized by second harmonic generation. The $d_{33}$ values obtained for the 1064 nm fundamental wavelength are listed in Table III along with some linear optical properties, as shown below:

TABLE III

|  | A204 ® Phenylsiloxane/ DR1 | A204 ® Phenylsiloxane/ ASD |
|---|---|---|
| Thickness (μm) | 0.76 | 0.69 |
| Refractive indices |  |  |
| λ (μm) |  |  |
| 0.532 | 1.628 | 1.537 |
| 1.000 | 1.527 | 1.504 |
| $d_{33}$ (pm/V) at 1.06 μm | 11.43 | 5.28 |

The poled and cured films had $d_{33}$ values of 11.43 and 5.28 pm/V for A204®/DR1 and A204®/ASD, respectively. Despite the fact that A204®/DR1 and A204®/ASD had similar dye chromophore densities in the polymer matrix, the poled/cured A204®/DR1 had a larger $d_{33}$ value. This was probably due to the fact that the DR1 had a larger nonlinear hyperpolarizability (μβ) compared with Disperse Orange 3 and a higher order parameter was obtained in the poling process under the same poling condition.

The temporal stability at 100° C. of second order nonlinearity after poling and crosslinking of A204®/DR1 and A204®/ASD were investigated, and the results are shown in FIG. 5. The results clearly indicate that the poled and cured A204®/ASD non-linear optical composition had better stability. After over 40 hours at 100° C., a reduction of 45% in $d_{33}$ was observed for the poled and cured A204®/ASD. Most of this loss was in the first few hours of heating. On the other hand, a reduction of 67% in $d_{33}$ was observed for the poled/cured A204® phenylsiloxane/DR1 non-linear optical composition after the same thermal treatment. There are two factors which were probably responsible for this difference. As mentioned earlier, the ASD could be chemically bonded into the cured phenyl siloxane polymer matrix. The bonding between ASD and the cured siloxane polymer restricted the molecular motion of the segments and hence prevented the randomization of the ordered NLO molecules. Secondly, the size of ASD was much larger than DR1. Based on free volume theory, the molecule with smaller size would tend to randomize faster in the polymer matrix.

In addition, the nonlinear optical coefficients ($d_{33}$) of the poled/cured A204®/DR1 and A204®/ASD nonlinear optical composition remained unchanged under ambient condition for at least 40 hours.

Figure 6:
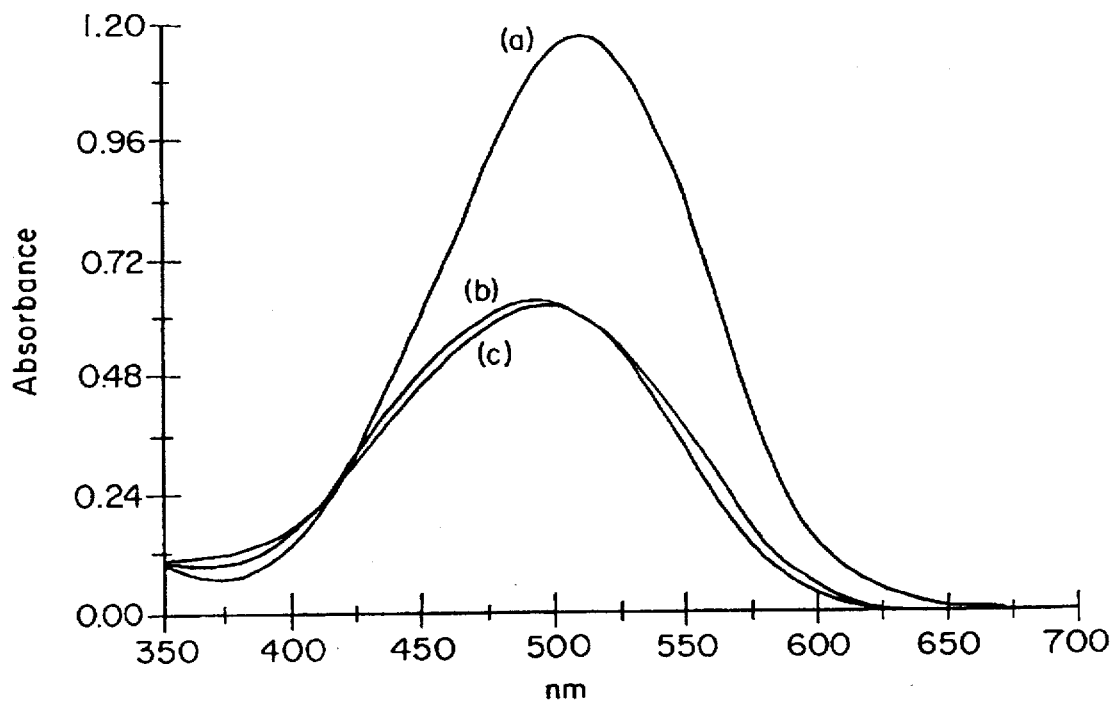
FIG. 6 shows absorption spectra for one of the embodiments described in Example 2 following regular intervals of exposure to elevated temperature.

To investigate the absorption behavior as a function of time, the absorption spectrum at 100° C. was taken at regular intervals over a 40 hour period for poled/cured A204®/DR1. An absorption peak at $\lambda_{max}$=508 nm existed before poling/curing. After poling/curing, $\lambda_{max}$ shifted to 493 nm with a decrease of absorbance. During the next 40 hours $\lambda_{max}$ shifted back toward longer wavelengths with a slight decrease in absorbance, as shown in FIG. 6. The dye absorption spectrum shape was similar to the spectrum obtained before the curing cycle. This confirmed that the azo dye left in the cured film had not degraded during the curing cycle. Plots a, b, and c are absorption spectra before poling, after poling and after prolonged exposure to elevated temperature, respectively.

Figure 7:
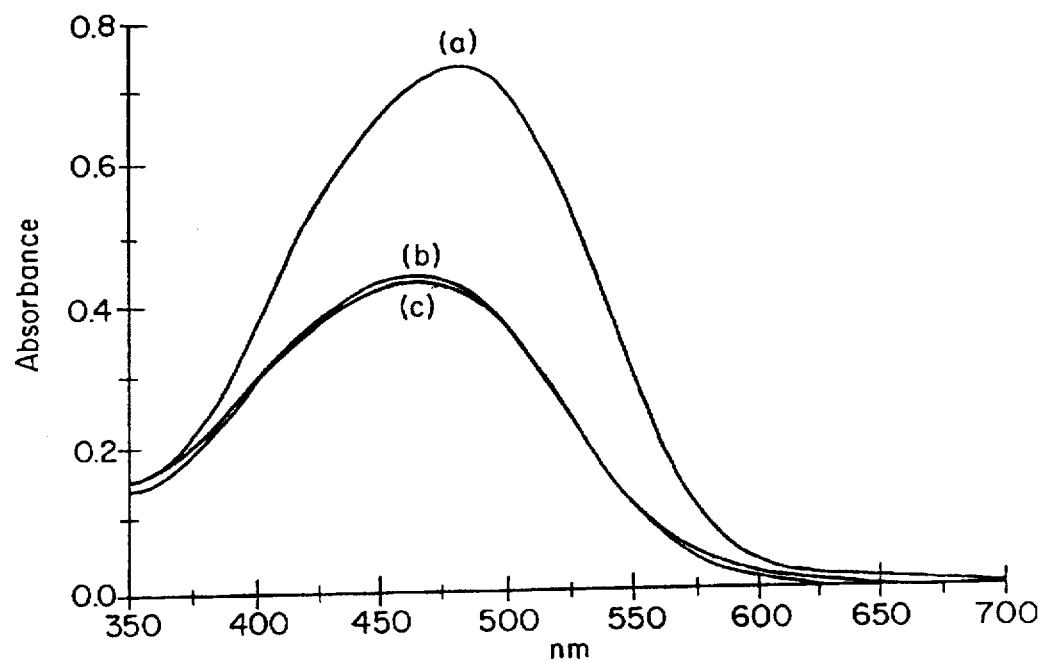
FIG. 7 shows absorption spectra for the other embodiment described in Example 2 following regular intervals of exposure to elevated temperature.

For A204®/ASD, the absorption spectrum was also taken regularly at 100° C. over a 40 hour period. Immediately after poling/curing, a decrease in absorbance was observed. The absorption peak of the disperse orange 3 chromophore ($\lambda_{max}$=480 nm) shifted toward a shorter wavelength, $\lambda_{max}$= 464 nm, as shown in FIG. 7. During the next 40 hours, the absorption spectrum remained almost unchanged. This result suggested that the dye/polymer system did not degrade or sublime throughout the whole period of thermal treatment. Plots a, b, and c are absorption spectra before poling, after poling and after prolonged exposure to elevated temperature, respectively.

EXAMPLE 3

A nonlinear optical composition of the invention was formed by the invention, wherein the alkoxy-silane employed in Example 2 formed both the silicon-containing component and the nonlinear optical component. The composition further included a component derived from polyamic acid.

The polyamic acid (19.5 weight % in 1-methyl-2-pyrrolidinone (NMP)) was derived from methylene dianiline and 3,3', 4,4'-benzophenonetetracarboxylic acid anhydride, both of which were available from Monsanto Chem. Co. The chemical structure of the polyamic acid is shown below:

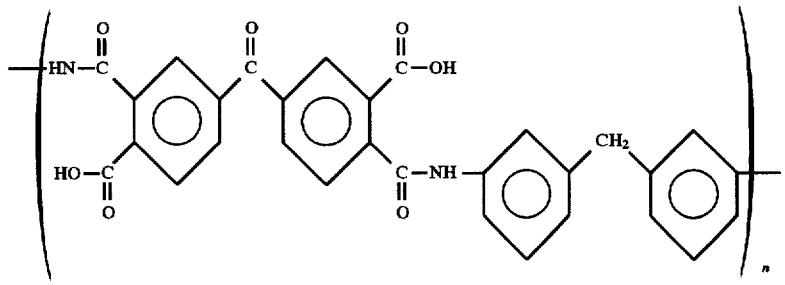

Alkoxy-silane dye (ASD) of (3-Glycidoxypropyl) Trimethoxysilane and 4(4'-nitrophenylazo) phenyl amine (Disperse Orange 3) was synthesized according to the methods employed in Examples 1 and 2. ASD (0.15 g) in 1 g acetone and 1.5 g NMP was added to 4 g of a polyamic acid solution.

Gels were prepared by spin-coating the polyamic acid/ASD solutions onto 1-mm-thick transparent microscope slides, and then baked at 70° C. under vacuum for 24 hours to remove residual solvent. Typical thicknesses of the gels obtained were approximately 0.635 μm. Indices of refraction at two different wavelengths (532 nm and 1064 nm) were measured using an ellipsometer. They were 1.687 and 1.523 for 532 nm and 1064 nm wavelengths, respectively. The absorption characteristics of the NLO molecules in the gels were recorded on a UV-Vis-NIR spectrophotometer.

The gels were poled by the corona discharge method, as in Example 1 and 2, described above. After the gels were poled at 80° C. for 6 min, the temperature was increased to 220° C. to cure the gels and thereby form the nonlinear optical composition. During this period (curing time) the poling field was kept on. The NLO compositions were maintained at 220° C. for 4 hours, and then cooled down to room temperature with the poling field on. The curing temperature was chosen to be 220° C. because the thermal decomposition temperature ($T_d$) of ASD was determined to be approximately 237° C. (onset point) by a thermogravimetric analyzer at a heating rate of 10° C./min in air.

The second order NLO properties of the poled polyimide/ASD samples were measured by second harmonic generation (SHG). The polarized Q-switched Nd:YAG laser with 10 ns pulse width and 20 Hz repetition rate was used as the light source. The typical energy per pulse of the laser was 15 mJ. The fundamental laser beam, after passing through the sample, was blocked by a $CuSO_4$ solution and a 532 nm interference filter. The SHG signal was detected by a photomultiplier tube, and averaged over 300 pulses in a boxcar integrator. The SHG intensity of a Y-cut single crystal of quartz with known thickness and $d_{11}$ value ($d_{11}$=0.364 pm/V) was measured as a reference mounted at the same position as that of the sample. The experimental set up and method for calculation of the second order nonlinear optical coefficient were the same as in Examples 1 and 2.

Figure 8:
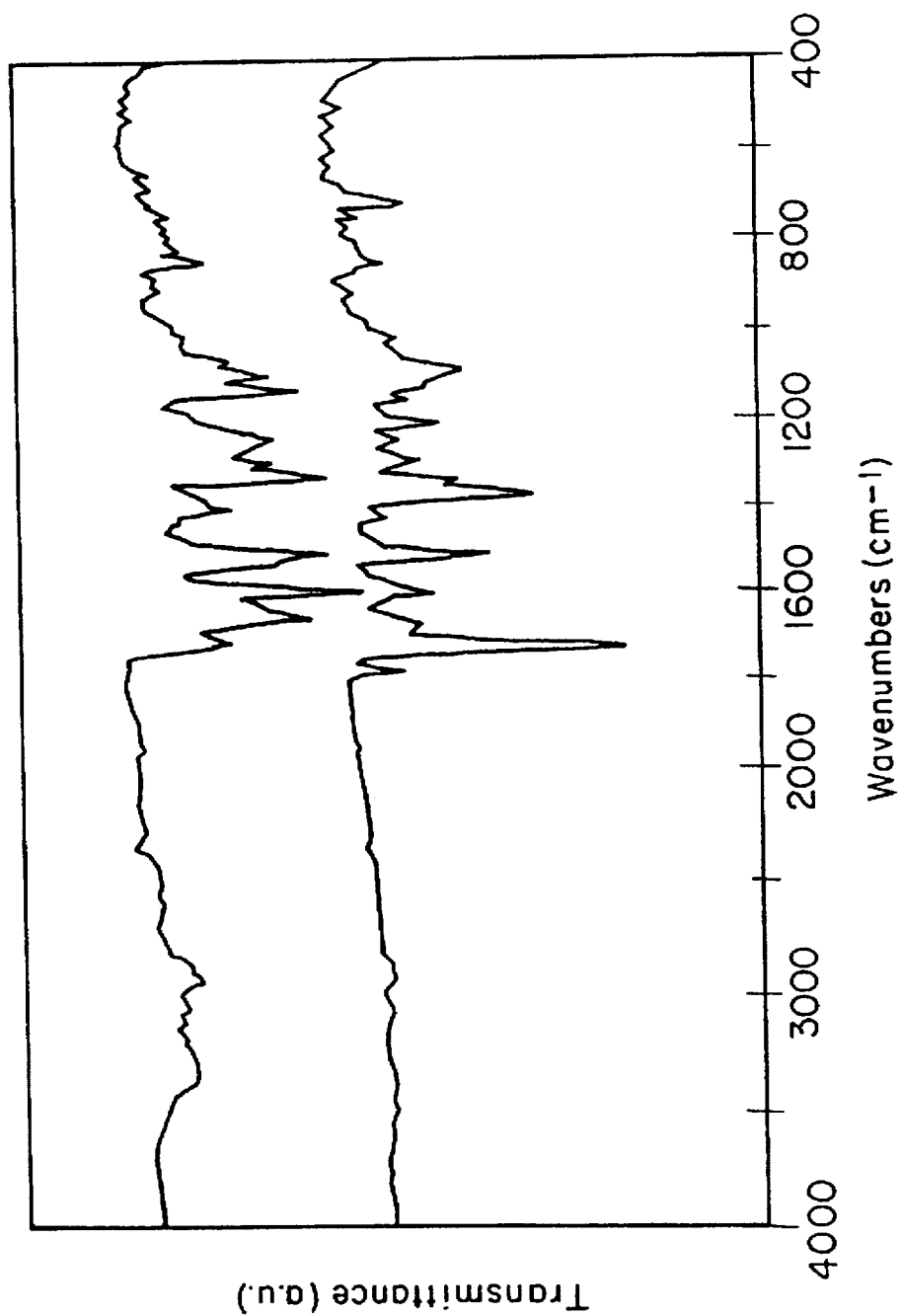
FIG. 8 shows infrared spectra of an embodiment of the nonlinear optical composition of the invention described in Example 3.

After curing of the polyamic acid/ASD at 220° C. for 4 hours, an appreciable change of absorbance in the IR spectra was observed due to the emergence of an imide absorption at 1788 $cm^{-1}$, 1724 $cm^{-1}$ and 1373 $cm^{-1}$, as shown in FIG. 8. The absorption peak around 1100 $cm^{-1}$ became broader and more complex after curing. This suggested that Si-O-Si bonding formed. The IR data also indicated that the NLO moieties still remained undegraded during the curing process. This was illustrated by the symmetric nitro absorption at 1340 $cm^{-1}$ and the C–N stretching of the aromatic nitro compound at 861 $cm^{-1}$. These two absorption peaks showed negligible change after curing.

The curing behavior of the polyamic acid and polyamic acid/ASD was studied by differential scanning calorimetry (ramp 50° C./min.). The Tg of the cured polyamic acid (polyamide) was 251° C. However, the Tg of the cured polyamic acid/ASD was not observed up to 275° C., perhaps due to the suppression of the glass transition by the formation of an inorganic matrix network.

Figure 9:
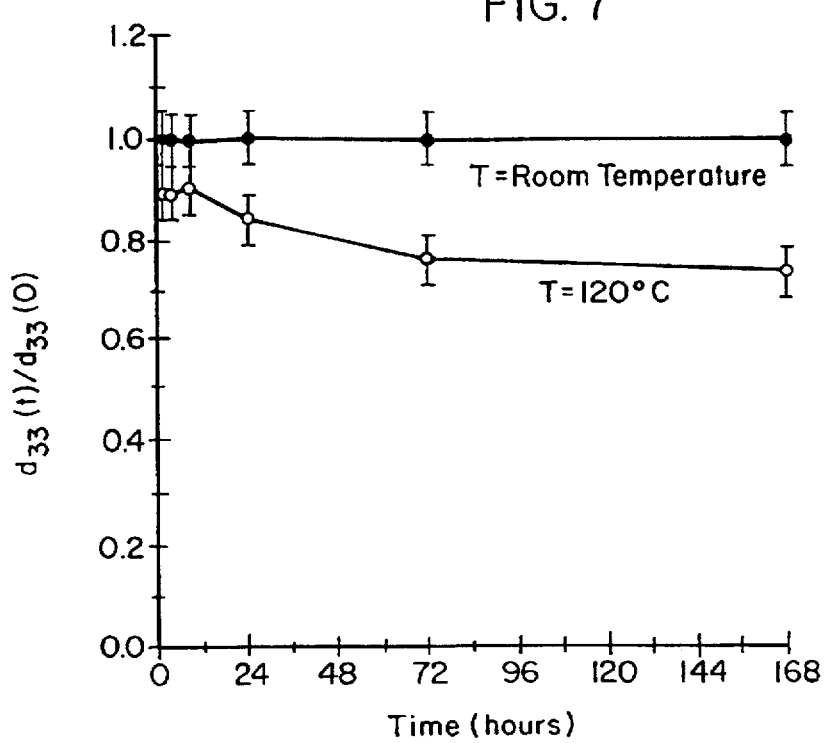
FIG. 9 shows plots of the second harmonic coefficient over time of the embodiment described in Example 3.

The poled and cured film had a $d_{33}$ value of 13.70 pm/V. The temporal stability at 120° C. of the second order nonlinearity after poling and curing of the polyamic acid/ASD was investigated, the results of which are shown in FIG. 9. After over 168 hours at 120° C., a reduction of 27% in $d_{33}$ was observed for the poled polyamide/ASD. Most of this loss was in the first few hours of heating. In addition, the NLO coefficients ($d_{33}$) of the poled polyamide/ASD remained unchanged under ambient conditions for at least 168 hours.

Figure 10:
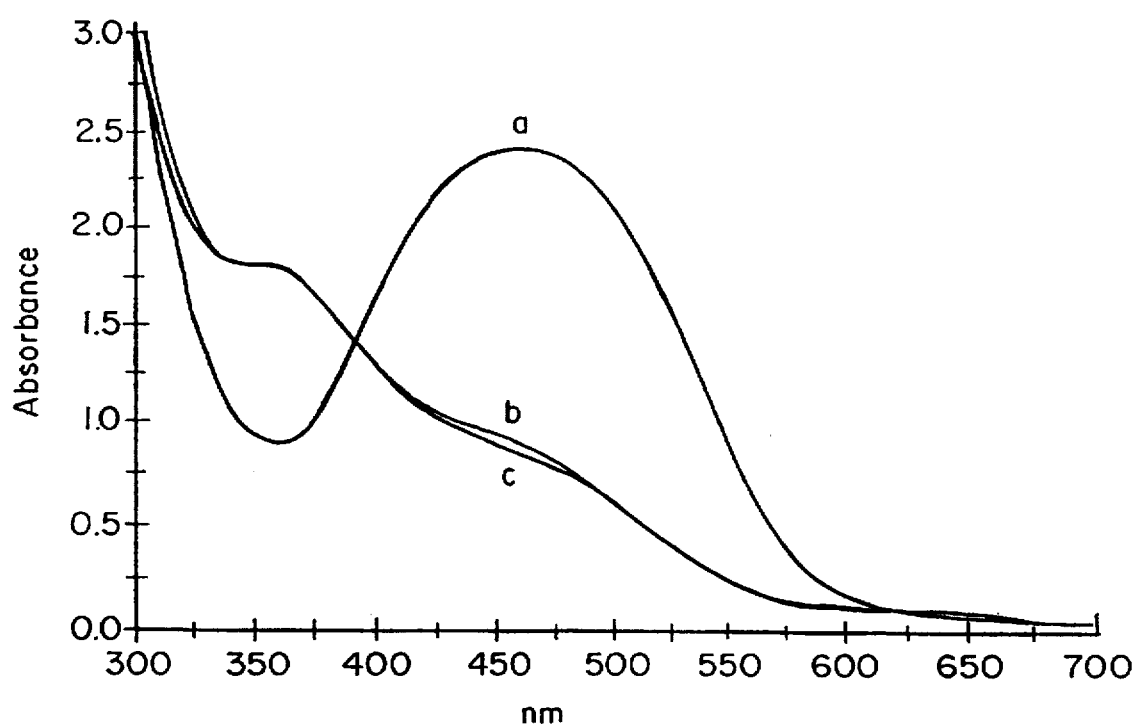
FIG. 10 shows UV-vis absorption spectra of the embodiment described in Example 3.

To investigate the absorption behavior as a function of time, the absorption spectrum was taken at regular intervals over a 168 hour period for the poled polyamide/ASD kept at 120° C. An absorption peak at $\lambda_{max}$=466 nm existed before poling/curing. Immediately after poling/curing, a large decrease in absorbance at $\lambda_{max}$=466 nm was observed, as shown in FIG. 10. Meanwhile, an absorption peak emerged at $\lambda_{max}$=345 nm. The degradation of the NLO dye chromophore was negligible. This implied that the polymer, and perhaps the dye moieties, possibly underwent conformation change during the curing process. Plots a, b, and c are absorption spectra before poling, after poling and after prolonged exposure to elevated temperature, respectively.

During the next 168 hours for the sample held at 120° C., the absorption spectrum remained almost unchanged. This result suggested that the NLO dye moieties in the composite system did not degrade or sublime throughout the whole period of thermal treatment. Optical quality of the compositions before and after curing was excellent. This implied that any phase separation must happen at very small scale compared to the light wavelength.

EXAMPLE 4

An alkoxysilane, bonded with a NLO chromophore, was reacted with a multifunctional phenoxy compound, 1,1,1,-tris (4-hydroxyphenyl)ethane, to form a crosslinked phenoxysilicon material. The reaction mechanism between the phenoxyl compound and alkoxysilane was similar to the sol-gel process. Upon heating to elevated temperatures, the multiphenoxy molecule, containing 2 phenol groups, and alkoxysilane, with 3 methoxyl groups, formed a highly-crosslinked network.

The multifunctional organic molecule, 1,1,1,-tris (4-hydroxyphenyl)ethane (THPE) is available from Aldrich Chemical Co., Inc., and was used as received. The alkoxysilane dye (ASD) was synthesized by the coupling of a monoepoxy of (3-glycidoxypropyl) trimethoxysilane and a monoamine of 4-(4'-nitrophenylazo) phenyl amine (Disperse Orange 3).

ASD (0.200 g) and THPE (0.150 g) were dissolved in 3 g of a mixed solvent (propylene glycol methyl ether acetate: 1,4 dioxane=3:1 by volume). The mixed solvent also contained 50 mg of N, N-dimethylbenzylamine and 50 mg of water. This solution was stirred by magnetic stirrer overnight before spin-coating. Films were prepared by spin-coating the ASD/THPE solutions onto 1-mm-thick transparent microscope slides (Fisher Premium). Typical thickness obtained were approximately 615 nm for the cured ASD/THPE. Indices of refraction at two different wavelengths (532 nm and 1064 nm) were measured using an ellipsometer. They were 1.744 and 1.638 for 532 and 1064 nm, respectively.

The glass transition temperatures, $T_g$, and the reaction behavior of the materials were obtained from differential scanning calorimetry using TA instrument DSC2910 at a heating rate of 10K/min. The isotrack technique of DSC was applied to obtain the optimum curing conditions. The thermal degradation temperatures ($T_d$) of the polymers were determined on a TA Instrument TGA2950 with a heating rate of 10K/min under air. Infrared spectra were recorded on a Perkin Elmer 1760X FTIR spectrometer.

The film was poled by the corona discharge method. The poling was started at 60° C. and then increased by 2° C./min. The crosslinking reaction proceeds reasonably fast only at temperatures above 180° C. The strength of the electric field used for poling was approximately 5.0 MV/cm. Thin films were heated to a temperature at which the crosslinking is fast (approximately 200° C.) with the electric field on. After a time sufficient to reach maximum crosslinking of the material (30 minutes), the sample was cooled down to room temperature with the poling field on. The curing temperature was chosen to be 200° C. partly because the thermal decomposition temperature of ASD was determined to be approximately 237° C. by a thermogravimetric analyzer.

The second order NLO properties of the poled ASD/THPE samples was measured by second harmonic generation (SHG) from 1064 nm laser radiation. The relaxation behavior of the second order nonlinear optical properties was studied by the decay of the second order nonlinear optical coefficient ($d_{33}$) as a function of time at both room temperature (25° C.) and 105° C. The polarized Q-switched Nd/YAG laser with 10 ns pulse width and 20 Hz repetition rate was used as the light source. The typical energy per pulse of the laser was 15 mJ. The fundamental laser beam after passing through the sample was blocked by $CuSO_4$ solution and a 532 nm interference filter. The second harmonic signal was detected by a photomultiplier tube, and averaged over 300 pulses in a boxcar integrator. The SH intensity of a Y-cut single crystal of quartz with known thickness and $d_{11}$ value ($d_{11}=0.364$ pm/V) was measured as a reference mounted at the same position as that of the sample.

The curing behavior of the ASD/THPE was studied by FTIR. After curing of the ASD/THPE at 200° C. for 30 minutes, an appreciable change of absorbance in the IR spectra was observed due to the emergence of an phenoxy-silicon absorption at 1257 and 960 $cm^{-1}$. This suggest that phenoxysilicon bonding formed. The IR data also indicated that the NLO moieties still remained undegraded during the curing process.

Figure 11:
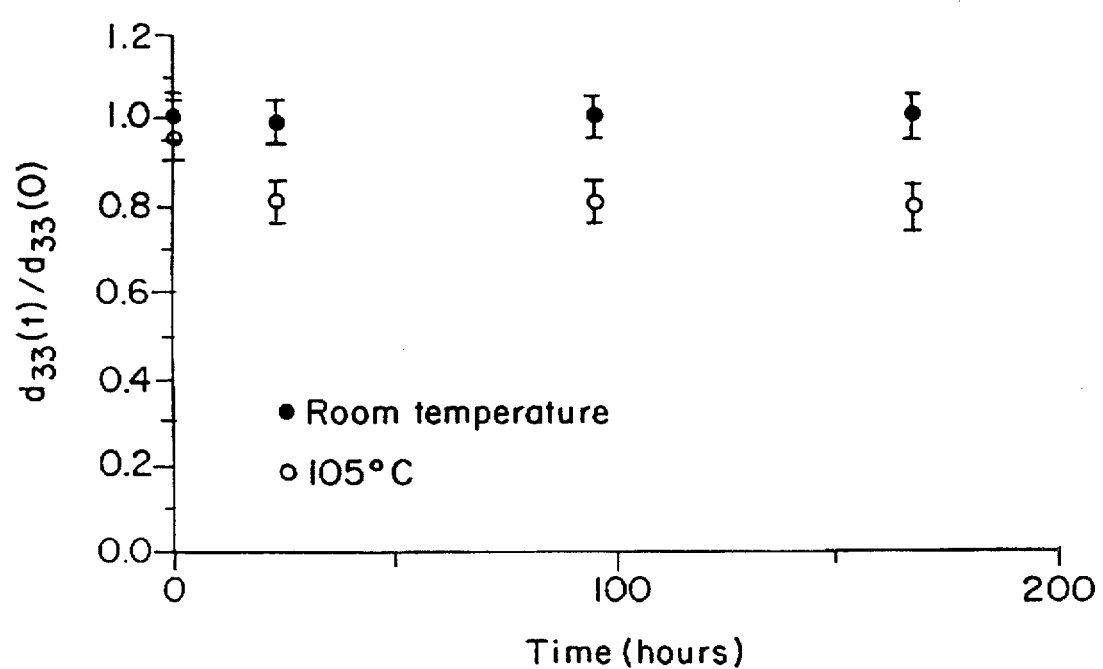
FIG. 11 shows plots of the second harmonic coefficient over time of the embodiment described in Example 4.

After crosslinking at 200° C. for 30 minutes, the crosslinked material was found to be amorphous with a $T_g$ of 107° C. and a degradation temperature of 251° C. (onset). The crosslinked and poled sample exhibits a second order nonlinear optical coefficient $d_{33}$ of 38.80 pm/V. After being subjected to thermal treatment at 105° C. for 24 h, a reduction of 19% of $d_{33}$ was observed for the poled and cured sample. This $d_{33}$ value remained unchanged under same thermal treatment for another 144 hours (FIG. 11).

EQUIVALENTS

Those skilled in the art will recognize, or be able to ascertain using no more than routine experimentation, many equivalents to the specific embodiments of the invention described specifically herein. Such are intended to be encompassed by the following claims.

What is claimed is:

1. A method of forming a nonlinear optical composition, comprising the steps of:

a) forming a sol of an alkoxy-silane compound that includes a nonlinear optical component;

b) exposing the sol to conditions sufficient to form a gel;

c) poling the nonlinear optical component, whereby a nonlinear optical composition is formed which exhibits nonlinear optical activity; and d) exposing the gel to conditions sufficient to cause transesterification of the alkoxy-silane compound, thereby forming the nonlinear optical composition.

2. The method of claim 1, wherein the alkoxy-silane compound forms an oligomer or polymer during formation of the gel.

3. The method of claim 1, wherein the alkoxy-silane compound is a nonlinear optical dye.

4. The method of claim 3, wherein the alkoxy-silane compound is a nonlinear optical azo dye.

5. The method of claim 4, wherein the nonlinear optical azo dye is formed from 3-glycidoxypropyl)trimethoxysilane and 4-(4'-nitrophenylazo)phenyl amine.

6. The method of claim 1, further including the step of combining the alkoxy-silane compound with a polyamic acid to form the sol.

7. The method of claim 1, further including the step of combining the alkoxy-silane compound with a multifunctional phenoxy compound to form the sol, the multifunctional phenoxy compound having the following general structural formula:

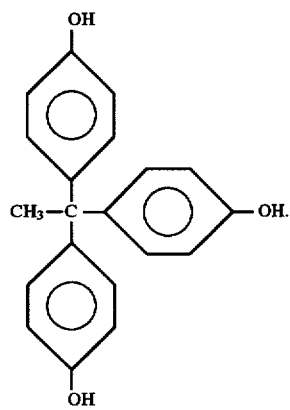

8. A method of forming a nonlinear optical composition, comprising the steps of:

a) forming a sol of a silicon-containing component, a nonlinear optical component, and a polyamic acid;

b) exposing the sol to conditions sufficient to cause the silicon-containing component to form a gel;

c) poling the nonlinear optical component, whereby the nonlinear optical component and the silicon-containing component together form a nonlinear optical composition which exhibits nonlinear optical activity; and d) exposing the gel to conditions sufficient to cause transesterification of the silicon-containing component, thereby forming the nonlinear optical composition.

9. A method of forming a nonlinear optical composition, comprising the steps of:

a) forming a sol of a silicon-containing component, a nonlinear optical component, and a multifunctional phenoxy compound, the multifunctional phenoxy compound having the general structural formula of

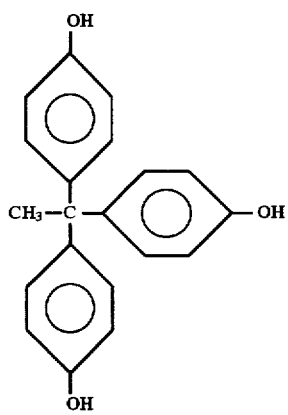

b) exposing the sol to conditions sufficient to cause the silicon-containing component to form a gel;

c) poling the nonlinear optical component, whereby the nonlinear optical component and the silicon-containing component together form a nonlinear optical composition which exhibits nonlinear optical activity; and d) exposing the gel to conditions sufficient to cause transesterification of the silicon-containing component, thereby forming the nonlinear optical composition.

* * * * *